United States Patent [19]

Cooper et al.

[11] 4,252,612
[45] Feb. 24, 1981

[54] NUCLEAR REACTORS

[75] Inventors: James L. Cooper, Bolton; Eric C. Heath, Upton-by-Chester, both of England

[73] Assignee: United Kingdom Atomic Energy Authority, London, England

[21] Appl. No.: 944,537

[22] Filed: Sep. 21, 1978

[30] Foreign Application Priority Data

Oct. 10, 1977 [GB] United Kingdom .............. 42140/77

[51] Int. Cl.³ .............................................. G21C 9/00
[52] U.S. Cl. ......................................... 176/38; 176/40
[58] Field of Search ...................... 176/38, 50, 68, 40, 176/77

[56] References Cited

U.S. PATENT DOCUMENTS

| | | | |
|---|---|---|---|
| 2,885,335 | 5/1959 | Moore | 176/77 |
| 3,076,753 | 2/1963 | Bell | 176/84 |
| 3,114,693 | 12/1963 | Furgerson | 176/77 |
| 3,702,802 | 11/1972 | Jansen | 176/38 |
| 3,793,144 | 2/1974 | Magladry | 176/82 |
| 4,003,785 | 1/1977 | Rau | 176/38 |
| 4,045,284 | 8/1977 | Rosewell | 176/38 |

FOREIGN PATENT DOCUMENTS

| | | | |
|---|---|---|---|
| 1916370 | 10/1970 | Fed. Rep. of Germany | 176/40 |
| 1286933 | of 1962 | France | 176/38 |
| 958088 | 5/1964 | United Kingdom | 176/40 |

Primary Examiner—Charles T. Jordan
Assistant Examiner—Edward F. Miles
Attorney, Agent, or Firm—Pollock, Vande Sande & Priddy

[57] ABSTRACT

A nuclear reactor having a core catcher comprising a group of upright assemblies disposed side-by-side beneath the reactor core. The assemblies each comprise a stack of spaced sacrificial plates mounted on a graphite column which collectively support the core. The plates are profiled to form vertical elongate cavities in which molten core debris can collect and solidify by heat conduction to the plates. The heat capacity of the core catcher is enhanced by cooling coils in the columns and by melting of the sacrificial plates which improves the heat conductivity of the debris.

12 Claims, 5 Drawing Figures

NUCLEAR REACTORS

BACKGROUND OF THE INVENTION

This invention relates to nuclear reactors which are fuelled with ceramic fuel, that is, nuclear fuel comprising one or more compounds such as an oxide or carbide of a fissile metal or metals (and of a fertile metal for breeding where applicable). The invention has particular reference to expedients known in the art as 'core catchers', which serve to catch and disperse the fuel constituting the reactor core as a safeguard against operation under extreme and emergency conditions such that a melt down of the fuel occurs. A typical example of fuel for which such a core catcher would be provided is mixed plutonium/uranium oxides such as is used in a gas cooled fast reactor.

The problems associated with the core catchers include dispersing the molten fuel debris to avoid criticality and in addition removing as much heat as possible from the dispersed melt, firstly, to avoid boiling of the fuel melt which would release fission products and plutonium aerosols, and secondly to bring about solidification of the molten debris to prevent its penetrating the reactor containing vessel. Ceramic nuclear fuels are notoriously poor heat conductors which exacerbates the problem. Therefore dispersion into as many small volumes as possible is desirable. Yet another problem resides in the avoidance of premature solidification of molten fuel in the upper region of the core catcher. If such a condition should occur upward radiation of heat from the melt could cuase serious damage to the remaining reactor components and thermal insulation therefore it is an object of the invention to provide a ceramic fuelled nuclear reactor having a core catcher which, in addition to dispersing a fuel melt into numerous small valumes, also reduces the tendency for premature solidification of fuel melt in the upper regions.

SUMMARY OF THE INVENTION

According to the invention a ceramic fuelled nuclear reactor has a core catcher comprising a group of closely spaced upright assemblies disposed in side-by-side array beneath the reactor core, each assembly comprising a stack of spaced sacrificial metal plates which are profiled at their peripheries to produce, in co-operation with adjacent assemblies, a plurality of vertically elongate cavities interconnected by voids between the stacked plates.

In the event of a melt-down of the reactor core the molten debris is able to flow relatively freely to the lower regions of the core catcher by way of the vertical cavities and can disperse throughout the array of assemblies solidifying relatively quickly as heat is given up to the plates. The solidified debris forms numerous interconnected noncritical masses and significant release of fission products and damage by burning of the reactor containing vessel is avoided. The sacrificial plates may be melted by the molten core debris, the resultant fuel-metal mix improving the heat conductivity of the core debris thereby promoting more rapid solidification of the melt. In a preferred construction of a ceramic fuelled nuclear reactor the sacrificial plates of the core catcher are generally hexagonal having corner cutaways to form elongate generally tapering shafts, the plates being mounted on an upright graphite tubular column containing a coolant conducting coil and having an upper platform for supporting fuel sub-assemblies of the reactor core.

DESCRIPTION OF THE DRAWINGS

Constructional embodiments of the invention will now be described by way of example with reference to the accompanying drawings, wherein.

DESCRIPTION OF THE PREFERRED EMBODIMENTS

Figure 1:
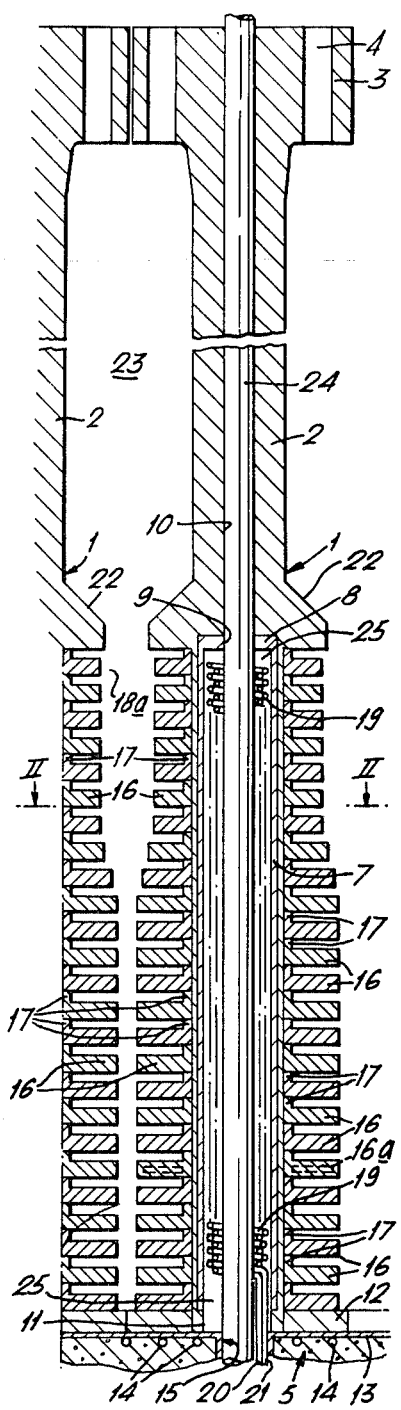
FIG. 1 is a fragmentary sectional view of one construction of core catcher, taken on line I—I of FIG. 2.
Figure 2:
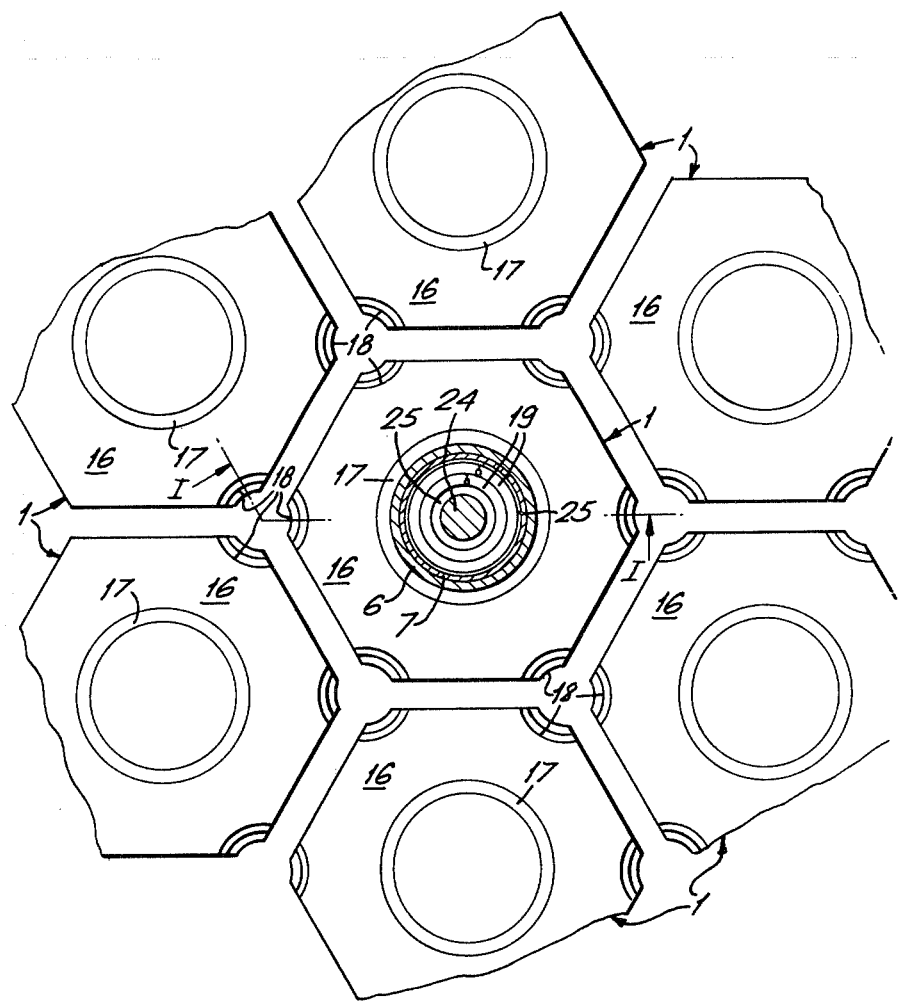
FIG. 2 is a plan view in section on line II—II of FIG. 1.

The core catcher illustrated in FIGS. 1 and 2 is used in a gas-cooled fast breeder nuclear reactor fuelled with mixed $PuO_2/UO_2$, and consists of an array of a plurality, for example more than 100, assemblies such as the two illustrated in FIG. 1 and the seven illustrated in FIG. 2 all generally designated 1. Each assembly 1 includes a tubular graphite column 2, carrying a hexagonal platform 3 at its upper end for supporting fuel sub-assemblies which are not shown. The platform has symmetrically disposed apertures 4 (three only are shown in the section of FIG. 1) providing location for fuel sub-assemblies which, together with those located and supported by the remainder of the assemblies 1, form the core of the nuclear reactor. A majority of the columns 2 each carry a cluster of seven fuel sub-assemblies but thirteen columns dispersed throughout the core each carry a cluster of only six fuel sub-assemblies the seventh position being occupied by a central control element. FIG. 1 illustrates one such column. As the nuclear reactor in this example is gas-cooled the core and coolant are contained in a pressure vessel which in this case is a prestressed concrete pressure vessel, a fragment of the base of the concrete pressure vessel being shown in FIG. 1 and designated 5. Each assembly 1 is mounted on the base 5 so that the weight of all the assemblies 1 and fuel sub-assemblies is carried by the base 5.

The lower region of column 2 of each assembly 1 contains a stainless steel tubular spine 7 having an upper end 8 formed with an aperture 9 registering with, and of similar diameter to, the bore 10 of the column 2. The lower end of the spine 7 terminates short of the lower end of the graphite column 2 and abuts a step 11 formed therein, the lower end of the graphite column being closely mounted in a graphite base member 12 which rests on and is supported by a steel liner 13 with cooling pipe 14 of the pressure vessel base 5. There is a penetration 15 of the liner 13 and base 5 which will be referred to hereafter.

The base member 12 supports a stack of sacrificial plates 16 of cast iron which define extended surfaces and are mounted on the graphite column 2, each plate having an integral spacer 17 to provide clearance between adjacent plates. Alternatively the plates 16 may be of copper or uranium which is depleted in the isotope $U_{235}$. Each plate 16 has a generally hexagonal periphery with the corners of the hexagon relieved by arcuate cut-aways 18 (see FIG. 2), the cut-aways collectively defining vertical shafts 18a. The cut-aways of the upper seven plates are greater cut-aways than most of the remainder, and two intermediate plates have graded cut-aways between the greater and smaller cut-aways. Thus the space available for accommodation of melted-down core consists of the space between the peripheries of the plates 16 of adjacent assemblies 1, the spaces between adjacent plates 16 of individual assemblies 1, and the generally tapering shafts 18a defined by the cut-aways and communicating with the spaces between the extended surfaces. Each plate 16 may have a neutron absorbing insert as shown designated 16a in broken line in one of the plates 16 of FIG. 1. The insert, which may be of boron, is wholly surrounded by metal.

The interior of the steel spine 7 of the assembly shown in FIG. 1 houses an elongate rod 24 which forms part of the control mechanism of the nuclear reactor. The rod 24 extends upwardly through bore 10 of column 2 into the reactor core and downwardly through the penetration 15 of the base 5 to be in communication with bottom control rod actuating gear (not shown) preferably in a pod inside the pressure boundary. The steel spine 7 also houses a water cooling coil 19 with inlet 20 and outlet 21 also extending through the penetration 15 to heat exchanger or other heat removal means (not shown) outside the pressure vessel. In an alternative construction there are two such cooling coils in each column 2. The remainder of the interior of the spine 7 is occupied by metallic copper 25, which not only assists in heat removal by the cooling coil 19 by virtue of good heat transfer from spine 7, column 2 and plate 16, but also serves to avoid any problems which might otherwise be presented by a leak in the coil or coils 19.

Finally the column 2 has a hexagonal baffle 22 of across-flats dimension similar to that of the plates 16 and with similar corner cut-aways 18. The space between the parts of columns 2 which are of reduced diameter conveniently forms an inlet gas plenum 23 for reactor coolant before it flows upwardly through the core.

In the unlikely event of melt down of fuel subassemblies the molten debris can drain through the apertures 4 into the plenum 23 thence downwardly in the shafts 18a to the base of the core catcher. The molten debris can percolate between the plates 16 where it is cooled quickly to solidify and to avoid boiling whereby fission products and plutonium aerosols would be released, the solidified mass growing upwardly. The heat capacity of the plates 16 is further enhanced by heat transfer to the cooling coils 19 and by melting of the plates 16, the molten metal homogeneously mixing with the molten oxide of the debris to improve heat conductivity. The graphite base member 12 protects the membrane 13 of the concrete vessel from direct contact with the initially molten mass of debris and heat is conducted away by the cooling coils 14 thereby preventing the base of the concrete vessel being burned through. Finally the core catcher ensures that the resultant solidified mass is safely contained in non-critical proportions.

Figure 3:
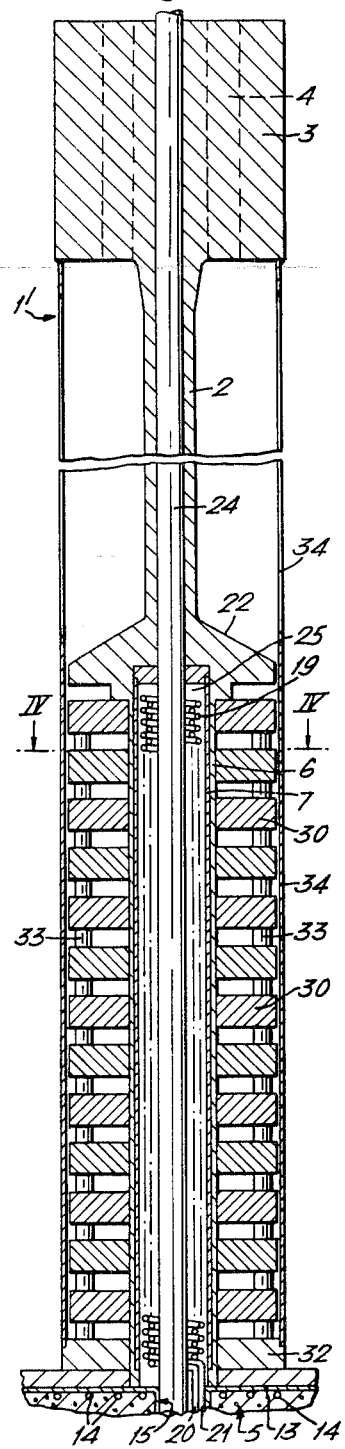
FIG. 3 is a fragmentary sectional view of another construction of core catcher taken on line III—III of FIG. 4.
Figure 5:
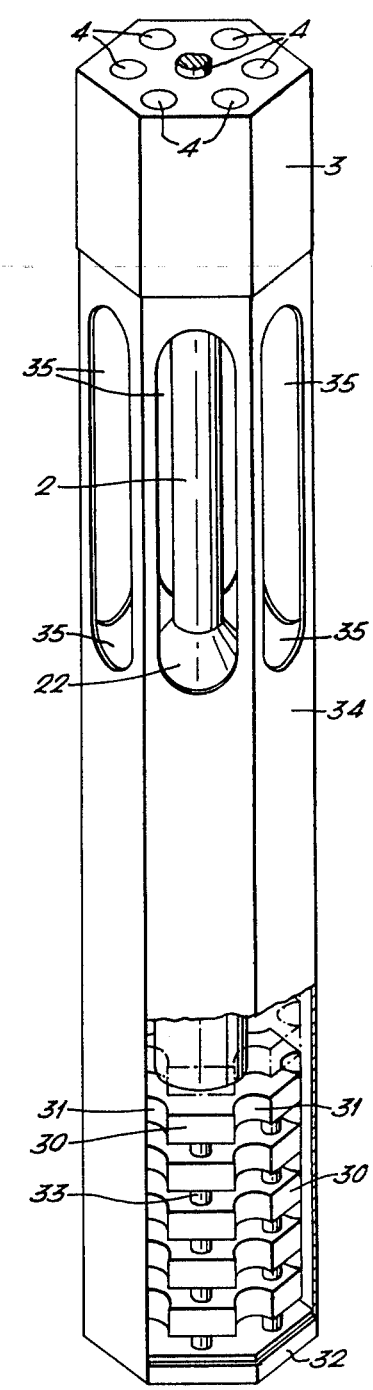
FIG. 5 is an isometric perspective view of a single assembly of the FIG. 3 construction, drawn to a smaller scale than FIG. 3.
Figure 4:
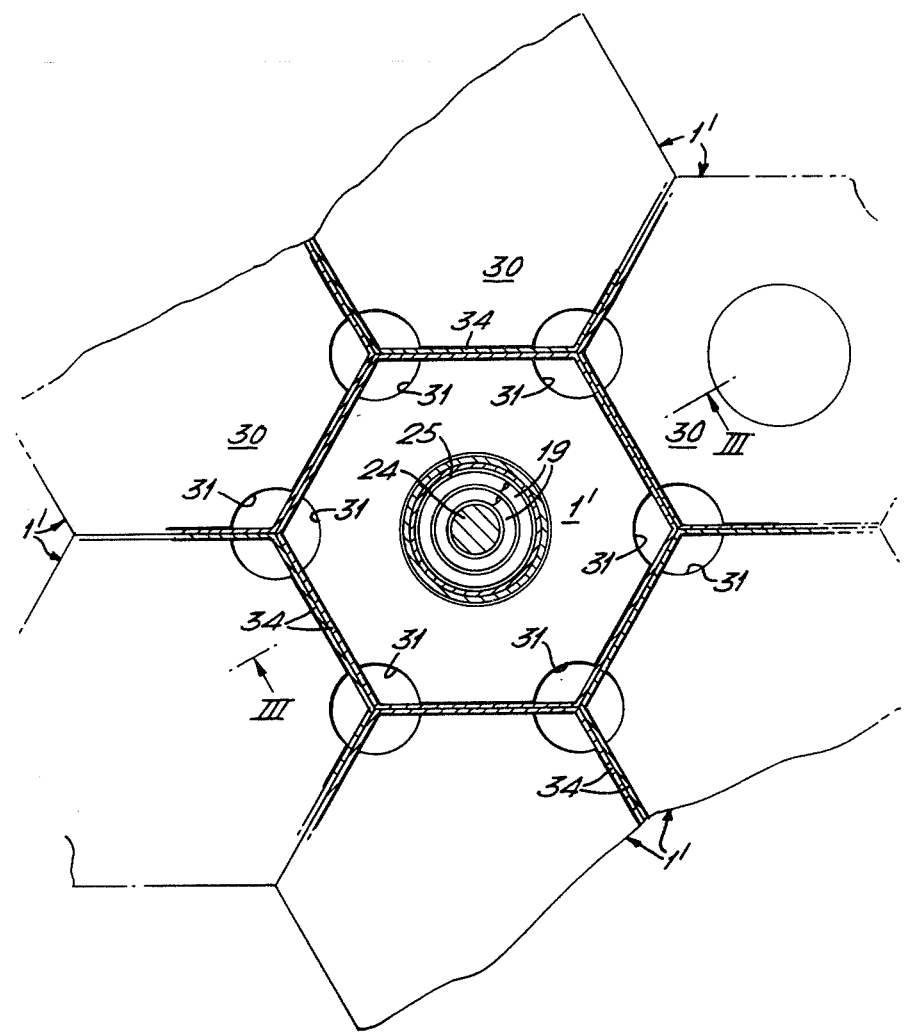
FIG. 4 is a plan view in section of line IV—IV of FIG. 3.

In another construction, illustrated in FIGS. 3-5, the construction has some similarity with the construction illustrated in FIGS. 1-2, notably that each assembly 1 has a column, platform, locating apertures, shroud, steel spine, base member, cooling coil, copper filling, and rod for reactor control mechanism similar to the FIGS. 1-2 construction, the same reference characters being employed. However, there are only thirteen hexagonal sacrificial plates 30 in each assembly 1, the plate corner cut-aways are designated 31 and the plates are stacked on the base member 12 with an intermediary member 32. They are retained in spaced relationship by graphite spacers 33 and they are enclosed by a hexagonal stainless steel wrapper 34. The wrapper has large access apertures 35, where the wrapper 34 registers with the column 2, and it extends at its upper end to fit the platform 3 and at its lower end to fit the member 32 which rests on the base member 12. The accommodation for melted-down core consists of the space within the wrappers 34 (which abut adjacent wrappers) that is, the space between plates 30 and the communications provided by the cut-aways 31.

We claims

1. A core catching apparatus for receiving molten debris from the fuel core of a nuclear reactor, said catcher apparatus comprising a group of adjacent upright assemblies and means for supporting said upright assemblies in side-by-side beneath said reactor core, each of said upright assemblies comprising:
   a vertically extending support column having an outer wall of refractory material; and,
   a vertically extending series of horizontally disposed sacrifial plates supported by said support column and spaced vertically apart to provide a plurality of horizontally extending spaces between said plates, the outer peripheries of said plates defining at least one vertically elongated cavity communicating with said plurality of horizontal spaces between said plates;
   said at least one vertically elongated cavity and said plurality of horizontal spaces providing interconnected voids for dispersing molten core debris into non-critical masses.

2. The core catching apparatus of claim 1 in which said support column contains cooling means for removing heat from said upright assembly, and in which said support column and said plates are arranged to conduct heat to said cooling means so as to solidify molten core debris received in said interconnected voids.

3. The core catching apparatus of claim 2 in which said support column is tubular and said cooling means includes a coolant conducting coil housed in said tubular support column, said coolant conducting coil being embedded in a mass of heat conducting material for conducting heat between said tubular support column and said coolant conducting coil.

4. The core catching apparatus of claim 1 in which said sacrifical metal plates have a generally rectilinear periphery, the corners of said rectilinear periphery being cut away to form a plurality of said vertically elongated cavities.

5. The core catching apparatus of claim 4 in which said sacrificial plates have a generally hexagonal periphery and each of the corners of said hexagonal periphery include arcuate cut-aways forming said vertically elongated cavities.

6. The core catching apparatus of claim 4 in which said vertically elongated cavities are tapered by variations in the horizontal extent of at least some of said sacrificial plates.

7. The core catching apparatus of claim 1 in which said sacrificial plates are of a material which upon melting mixes with said molten core debris to improve its heat conductivity.

8. The core catching apparatus of claim 1 in which at least some of said sacrificial plates include an insert of a second material having a neutron absorbing capacity greater than the sacrificial material of said plates.

9. The core catching apparatus of claim 1 in which said sacrificial plates each include vertically extending spacing means and an aperture for receiving said supporting column, said support column passing through the apertures of said series of plates and the plates of said series being retained in said spaced apart relationship by said spacing means.

10. A core catcher for ceramic fueled nuclear reactors comprising a group of adjacent upright assemblies disposed in side-by-side array and including means for supporting a reactor core, each assembly comprising:
- a tubular column sheathed in refractory material;
- a vertically extending series of spaced apart, horizontally disposed sacrificial metal plates mounted on said tubular column, each of said plates having a generally rectilinear periphery with the corners of said periphery cutaway to define a plurality of vertically elongated cavities communicating with the spaces between said plates; and,
- a coolant conducting coil housed in said tubular column and embedded in a heat conducting mass for conducting heat from the sacrificial plates between the tubular column and the coolant conducting coil.

11. The core catcher of claim 10 in which said sacrificial plates are of cast iron, copper or uranium metal depleted in the isotope U-235.

12. The core catcher of claim 11 in which at least some of said sacrificial plates contain a mass of boron.

* * * * *